(12) United States Patent
Castiglioni et al.

(10) Patent No.: US 7,040,002 B2
(45) Date of Patent: May 9, 2006

(54) METHOD FOR TERMINATING A CONDUCTOR OF A SUPERCONDUCTING CABLE

(75) Inventors: Walter Castiglioni, Magenta (IT); Gianangelo Cavalleri, Cemusco Sul Naviglio (IT); Giacomo Coletta, Peschiera Borromeo (IT); Pietro Corsaro, Busto Arsizio (IT); Dirk Kunze, Erlangen (DE); Pierluigi Ladie', Milan (IT); Marco Nassi, Turin (IT); Sergio Spreafico, Erba (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 451 days.

(21) Appl. No.: 10/218,636

(22) Filed: Aug. 15, 2002

(65) Prior Publication Data
US 2003/0040439 A1 Feb. 27, 2003

Related U.S. Application Data

(60) Provisional application No. 60/315,038, filed on Aug. 28, 2001.

(30) Foreign Application Priority Data
Aug. 27, 2001 (EP) .................................. 01203197

(51) Int. Cl.
*H01L 39/24* (2006.01)
(52) U.S. Cl. .................. 29/599; 29/857; 29/858; 29/860; 29/869; 29/33 F; 29/748; 174/75 R; 174/125.1; 505/220; 505/706
(58) Field of Classification Search .................. 29/599, 29/857, 858, 860–863, 869, 33 F, 748; 174/125.1, 174/128.4, 15.4, 75 R, 128.2; 361/19; 438/119; 439/91; 505/220, 230–234, 706; 727/62; 427/62
See application file for complete search history.

(56) References Cited

U.S. PATENT DOCUMENTS
4,333,228 A * 6/1982 Koch .......................... 29/599

(Continued)

FOREIGN PATENT DOCUMENTS
DE 198 03 687 C 1 11/1999

(Continued)

OTHER PUBLICATIONS
Yasutaka, F., "Method for Connecting Conductor of Superconductive Direct Current Cable", Patent Abstracts of Japan of JP No. 10-228933, Aug. 25, 1998.

(Continued)

*Primary Examiner*—Minh Trinh
*Assistant Examiner*—Donghai D. Nguyen
(74) *Attorney, Agent, or Firm*—Finnegan, Henderson, Farabow, Garrett & Dunner, L.L.P.

(57) ABSTRACT

A method of terminating at least one conductor of a superconducting cable comprising a plurality of superconducting tapes, comprising the steps of associating an electrically conductive connector radially at the at least one conductor, embedding and end of the superconducting tapes in a thermosetting resin, embedding an end portion of the superconducting tapes in a solder and achieving an electric contact by the solder. Moreover, the invention relates to a terminated conductor of a superconducting cable, a superconducting cable, a joint between conductors of two superconducting cables, a current transmission/distribution network, and a terminator for at least one conductor of a superconducting cable that embody the above method.

19 Claims, 8 Drawing Sheets

U.S. PATENT DOCUMENTS

| | | | |
|---|---|---|---|
| 5,308,831 A | * 5/1994 | Fevrier et al. | 505/100 |
| 5,583,319 A | * 12/1996 | Lieurance | 174/84 R |
| 6,584,333 B1 | * 6/2003 | Gauss et al. | 505/220 |
| 6,844,064 B1 | * 1/2005 | Ayai et al. | 428/375 |

FOREIGN PATENT DOCUMENTS

| | | |
|---|---|---|
| WO | WO 00/14827 | 3/2000 |
| WO | WO 00/39812 | 7/2000 |
| WO | WO 01/08234 A2 | 2/2001 |
| WO | WO 01/33580 A1 | 5/2001 |

OTHER PUBLICATIONS

Michitaka, O., "Connection Structure of Superconductor", Patent Abstracts of Japan of JP No. 06-104026, Apr. 15, 1994.

Yasuo, S., "Method for Formation of Superconductor Wire Connecting Part", Patent Abstracts of Japan of JP No. 03-295207, Dec. 26, 1991.

R. Cava;"Oxide Superconductors", J. Am. Ceram. Soc., 83 [1], pp. 5-28, (2000).

* cited by examiner

METHOD FOR TERMINATING A CONDUCTOR OF A SUPERCONDUCTING CABLE

CROSS REFERENCE TO RELATED APPLICATIONS

This application claims the benefit of U.S. Provisional Application No. 60/315,038, filed Aug. 28, 2001, the content of which is incorporated herein by reference, and claims the right to priority based on European Application No. 01203197.7, filed Aug. 27, 2001, the content of which is incorporated herein by reference.

BACKGROUND OF THE INVENTION

1. Field of the Invention

The present invention relates to the termination of the conductor of a superconducting cable.

In the present description and attached claims, the expression "superconducting cable" is used to indicate a cable intended for carrying electric current in so-called conditions of superconductivity, that is, in conditions of almost zero electrical resistance under direct current transport condition.

In the present description and attached claims, the expression "conductor" is used to indicate the electrically active part of a superconducting cable, intended for carrying the phase electric current or that of each phase of a three-phase current system (where necessary, more in particular referred to as "phase conductor"). For the sake of brevity, and unless otherwise indicated, the expression "conductor" is also used to indicate the "return conductor", that is, the electrically active part of a superconducting cable capable of transmitting the same quantity of electric current of the phase conductor/s associated with it, but in the reverse direction.

In the present description and attached claims, the expression "conductor termination" is used to indicate the connection to the conductor of an electrically conductive connector to allow fixing it to a second cable conductor, either superconducting or non-superconducting, or to an electrical apparatus in general, such as a transformer, an electrical motor, etcetera. In particular, in the case of fixing to a second conductor of superconducting cable, the termination in the above meaning must thus be intended as the formation of a joint between the two conductors. Moreover, for brevity, the electrically conductive connector shall sometimes be referred to as "top connector" in the following description.

A similar meaning is to be given to the terms "terminated conductor" and "terminator".

2. Description of the Related Art

Warm dielectric (WD) superconducting cables and cold dielectric (CD) superconducting cables are known.

A warm dielectric superconducting cable (or each phase element of a warm dielectric three-phase cable) essentially comprises a tubular element for supporting one or more layers of superconducting tapes, and substantially defining a flow channel for a cryogenic fluid, a cryostat arranged coaxially external to the layers of superconducting cables, and a dielectric arranged coaxially external to the cryostat.

In the present description and attached claims, the expression "superconducting tapes" is used to encompass both types of superconducting material described hereinafter.

The expression "superconducting material" is used to indicate a material such as, for example, particular ceramic materials based on mixed oxides of copper such as those discussed by Cava R., J. Am. Ceram. Soc., 83 [1], 5–28 (2000). These compounds exhibit a substantially zero resistivity below a certain temperature, defined as critical temperature, or Tc. For example, the critical temperature for the above materials ranges between about 80K (−193° C.) and about 150K (−123° C.).

The superconducting material, in particular the BSCCO material, is commonly manufactured and used in the form of single- or multi-filament tapes wherein filaments of superconducting material are embedded in a metal matrix, usually silver, optionally added with aluminium or magnesium; or, in particular the YBCO and REBCO material is manufactured and used in the form of a film of superconducting material supported by a metal tape, and optionally coated with one or more oxide layers.

A cold dielectric superconducting cable (or each phase element of a cold dielectric three-phase cable) essentially comprises a tubular element for supporting one or more layers of superconducting tapes, and substantially defining a flow channel for a cryogenic fluid, and, arranged coaxially external to the layers of superconducting tape, in a sequence: a dielectric, a return conductor, an annular flow channel for the cryogenic fluid, and a cryostat. As an alternative, a single cryostat is provided for all phases present in the superconducting cable.

The tubular element for supporting the layers of superconducting tapes of the phase conductor can be at least partly made of a material exhibiting a low electrical resistance with the function of protecting the superconducting material from overcurrent, as described for example in the international patent application WO 00/39812 in the name of the Applicant. With the same function, in particular in the case of the return conductor, a screen external to the outermost layer of superconducting material can be provided, for example comprising one or more layers of conductive tapes, for example of copper.

In the present description and attached claims, the expression "cryostability device" is used to indicate such a tubular supporting element and/or such an external screen.

The operating temperature of a superconducting cable, a term used to indicate the temperature at which the superconducting cable transmits electric current in superconductivity conditions, is below the critical temperature of the superconducting material used.

For this purpose, as said, the superconducting cable is provided with at least one channel for the flow of a cryogenic fluid. The cryogenic fluid generally is helium, nitrogen, hydrogen and/or argon at application-specific temperature and pressure.

As known from the international patent application WO 01/08234 in the name of American Superconductor Corporation and of the Applicant, the prolonged contact of the superconducting tapes with the cryogenic fluid at the operating temperature and pressure, as well as the subjection to thermal cycles between such operating temperature and ambient temperature, can cause the infiltration of the cryogenic fluid into the superconducting tapes, with the consequent formation of "balloons", which cause the deterioration of the superconducting tape performance.

To obviate the problem, that document describes a superconducting ceramic conductor for use in a cryogenic fluid, comprising a composite ceramic superconducting tape or wire and a sealing structure hermetically surrounding the outer surface of the composite ceramic tape/wire. In a first embodiment, the sealing structure is metallic and in particular, it comprises rolled metallic tapes on the greater faces of the superconducting tape, and non-porous solder fillets, for example of Pb—Sn—Ag, Pb—Sn, Sn—Ag, In—Pb, at the side faces of the superconducting tape. As an alternative, the solder can include dispersions of metallic fibres or particles in an epoxy resin.

In a different embodiment, the sealing structure comprises a polymer layer with optional metal elements dispersed therein, surrounding the outer surface of the superconducting tape or wire. The superconducting tape ends can be encapsulated through solder or silicone.

SUMMARY OF THE INVENTION

The Applicant has perceived that the problem of the cryogenic fluid infiltration occurs to a greater extent at the ends of the superconducting tapes, as when a conductor is cut to size upon installation, since the superconducting material is directly exposed at the cross section or end.

In the following description and attached claims, the expression "end of a superconducting tape" is used to indicate a longitudinal part of a superconducting tape immediately adjacent to and comprising its exposed cross section.

More generally, the Applicant has perceived that the termination of a conductor of a superconducting cable must meet the two requirements of ensuring the sealing of the ends of the superconducting tapes of the conductor against the diffusion of the cryogenic fluid, and of ensuring a good electric contact between the conductor and the top connector and/or between the conductor and that of a second superconducting cable, retaining the above properties following thermal cycles between ambient temperature and operating temperature.

Moreover, the Applicant has perceived that the use of only a plastic material or of only a solder is not sufficient to meet the above requirements because in the first case there is not sufficient electric contact and in the second case, the amount of solder needed is such as to practically imply such a high porosity of the solder as to allow the formation of microchannels within which the cryogenic fluid infiltrates into the superconducting tapes.

In a first aspect, the present invention relates to a method of terminating at least one conductor of superconducting cable comprising a plurality of superconducting tapes, comprising the steps of:
a) associating an electrically conductive connector radially at the at least one conductor,
b) embedding an end of the superconducting tapes in a thermosetting resin,
c) embedding an end portion of the superconducting tapes in a solder, and
d) achieving an electric contact by the solder.

In the present description and attached claims, the expression "radially at the conductor" is used to indicate an inside or outside position with respect to the conductor.

In the following description and attached claims, the expression "end portion of a superconducting tape" is used to indicate a longitudinal part of superconducting tape adjacent to its end as defined above.

In some embodiments, the step c) of embedding an end portion of the superconducting tapes in a solder is carried out by embedding the end portions of at least all superconducting tapes of a same conductor in a common bulk of solder.

If there are two conductors, the solder bulk can therefore be common to the superconducting tapes of both conductors, or two solder bulks can be made, each common to the superconducting tapes of a respective conductor.

More in particular, the step c) of embedding an end portion of the superconducting tapes in a solder is carried out by providing at least one sleeve surrounding an end portion of conductor and filling the sleeve with solder.

In addition, step b) of embedding an end of the superconducting tapes in a thermosetting resin can be carried out by embedding the ends of at least all superconducting tapes of a same conductor in a common bulk of thermosetting resin.

If there are two conductors, the thermosetting resin bulk can therefore be common to the superconducting tapes of both conductors, or two thermosetting resin bulks can be made, each common to the superconducting tapes of a respective conductor.

More in particular, the step b) of embedding an end of the superconducting tapes in a thermosetting resin can be carried out by providing at least one collar surrounding at least one end of conductor and filling the collar with the thermosetting resin.

In particularly preferred embodiments, the step d) of achieving an electric contact by the solder and the step c) of embedding an end portion of the superconducting tapes in a solder are carried out by embedding the end portions of at least all superconducting tapes of a same conductor and a corresponding portion of the connector in a common bulk of solder.

In alternative embodiments, step b) of embedding an end of the superconducting tapes in a thermosetting resin is carried out by embedding at most individually said end of each superconducting tape in a respective bulk of thermosetting resin.

If there are two conductors, each thermosetting resin bulk can therefore be intended to have the end of a single superconducting tape embedded, or the ends of a pair of a superconducting tape of the first conductor and of a superconducting tape of the second conductor.

More in particular, the step b) of embedding an end of the superconducting tapes in a thermosetting resin is carried out by introducing at most individually the free end of each superconducting tape in a respective cap and filling at least partly each cap with the thermosetting resin.

In the following description and attached claims, the expression "free end of a superconducting tape" is used to indicate a longitudinal part of superconducting tape adjacent to and extending from its exposed cross section. Said free end can comprise all or part of the end, all or part of the end portion, and also a part upstream of the end portion.

In the present description and attached claims, the expression "cap" is used to indicate an element having a hole intended for loosely receiving the free end of at least one superconducting tape, wherein the hole can be a through or a blind hole, optionally provided with one or more leaks.

Moreover, preferably, the step c) of embedding an end portion of the superconducting tapes in a solder is carried out by embedding at most individually the end portion of each superconducting tape in a respective bulk of solder.

If there are two conductors, each bulk of solder can therefore be intended to have the end of a single superconducting tape embedded, or the ends of a pair of a superconducting tape of the first conductor and of a superconducting tape of the second conductor.

In some embodiments, there is a step e) of arranging at most individually a free end of each superconducting tape in a respective electrically conductive cap, step b) is carried out by filling a first part of each cap with the thermosetting resin, and step c) is carried out by filling at least a second part of each cap with the solder.

In this case, step d) of achieving an electric contact by the solder can be carried out by fixing each cap in contact with the connector.

In an alternative, step d) of achieving an electric contact by the solder comprises providing a respective electrically conductive tape extending from each cap.

Preferably, moreover, there is a step f) of achieving an electric contact between the connector and a cryostability device associated to the superconducting tapes.

In particular in the case of a phase conductor, the cryostability device is a tubular, at least partly conductive element supporting the superconducting tapes, and step f) of achieving an electric contact between the connector and the cryostability device, and step c) of embedding an end portion of the superconducting tapes in a solder are carried out by embedding the end portions of at least all superconducting tapes of a same conductor and a corresponding portion of the tubular element in a common bulk of solder.

In particular in the case of a return conductor, the cryostability device is an at least partly conductive screen coaxially external to the superconducting tapes, and step f) of achieving an electric contact between the connector and the cryostability device is carried out by fixing a portion of the screen in contact with the connector.

Solders useful for the purposes of the present invention have a melting point lower than a temperature damaging the superconducting tapes.

Preferably, the solder is a Sn—Pb—Bi alloy.

Even more preferably, the solder is an alloy comprising 43% Sn, 43% Pb and 14% Bi.

Preferably, the thermosetting resin is an epoxy or silicone resin.

Preferably, moreover, the thermosetting resin is added with a hardener.

Even more preferably, the thermosetting resin is that available under the trademark Araldite® from Ciba Specialites Chimiques SA, Rueil-Malmaison Cedex, France. For example, the thermosetting resin is Araldite® added with HY 951 as a hardener.

Preferably, moreover, the thermosetting resin is added with a mineral filler.

The mineral filler preferably is quartz or aluminium oxide.

More preferably, the thermosetting resin is Araldite® added with quartz or aluminium oxide as a mineral filler.

Preferably, moreover, the superconducting material of each superconducting tape is an oxide of bismuth, lead, strontium, calcium, and copper (BSCCO).

Preferably, moreover, each superconducting tape comprises a hermetically sealing structure surrounding its outside surface along its length, for example as described in the above-mentioned international patent application WO 01/08234.

In a second aspect thereof, the present invention relates to a terminated conductor of a superconducting cable comprising a plurality of superconducting tapes and an electrically conductive connector associated to said superconducting cable radially at said conductor, wherein ends of said superconducting tapes are embedded in a thermosetting resin and end portions of said superconducting tapes are embedded in a solder, the solder being in electric contact with the connector.

In a third aspect thereof, the present invention relates to a superconducting cable comprising at least one conductor comprising a plurality of superconducting tapes and a respective electrically conductive connector associated radially at said at least one conductor, wherein ends of said superconducting tapes are embedded in a thermosetting resin and end portions of said superconducting tapes are embedded in a solder, an electric contact being achieved by the solder.

In a fourth aspect thereof, the present invention relates to a joint between conductors of two superconducting cables, each conductor comprising a plurality of superconducting tapes, the joint comprising an electrically conductive connector butt-coupling the conductors of the two superconducting cables, wherein ends of the superconducting tapes are embedded in a thermosetting resin and end portions of the superconducting tapes are embedded in a solder, at least one of said thermosetting resin and said solder having the superconducting tapes of both said conductors embedded, and an electric contact being achieved by the solder.

In some embodiments, the joint comprises a collar surrounding the ends of the two conductors and filled with the thermosetting resin.

Preferably, moreover, the joint comprises a sleeve surrounding the end portions of the two conductors and filled with the solder.

In a fifth aspect thereof, the present invention relates to a current transmission/distribution network comprising at least one terminated conductor of a superconducting cable as described above, at least one superconducting cable as described above, and/or at least one joint between conductors of two superconducting cables as described above.

In a sixth aspect thereof, the present invention relates to a terminator for at least one conductor of superconducting cable comprising a plurality of superconducting tapes, the terminator comprising:

an electrically conductive connector radially combinable to said at least one conductor, delimiting elements intended for containing thermosetting resin and/or solder and suitable for being associated to the at least one conductor so that ends of the superconducting tapes are embedded in the thermosetting resin, so that end portions of the superconducting tapes are embedded in the solder, and so that an electric contact is achieved by the solder.

In an embodiment, the delimiting elements comprise a collar suitable for surrounding the ends of at least all superconducting tapes of a same conductor and intended for containing the thermosetting resin.

As an alternative or in addition, the delimiting elements comprise a sleeve suitable for surrounding the end portions of at least all superconducting tapes of a same conductor and intended for containing the solder.

Moreover, in some embodiments, the delimiting elements comprise a plurality of electrically conductive caps, each suitable for containing the free end of at least one respective superconducting tape and each intended for containing a bulk of thermosetting resin.

Moreover, the electrically conductive caps can be suitable for containing at least one bulk of solder each.

In an embodiment, each cap comprises an electrically conductive tape extending from the end opposed to the end receiving the superconducting tape, and said connector comprises a first and a second tubular element, the outside surface of the first tubular element and the inside surface of the second tubular element being sloped with respect to the respective axes, with angles of inclination selected so that the first and the second tubular element realise a conical coupling suitable for clamping the electrically conductive tapes extending from said caps.

BRIEF DESCRIPTION OF THE DRAWINGS

Further features and advantages of the present invention shall appear more clearly from the following detailed description of some exemplifying embodiments thereof, made hereinafter with reference to the attached drawings. In the drawings.

DETAILED DESCRIPTION OF THE INVENTION

Figure 1:
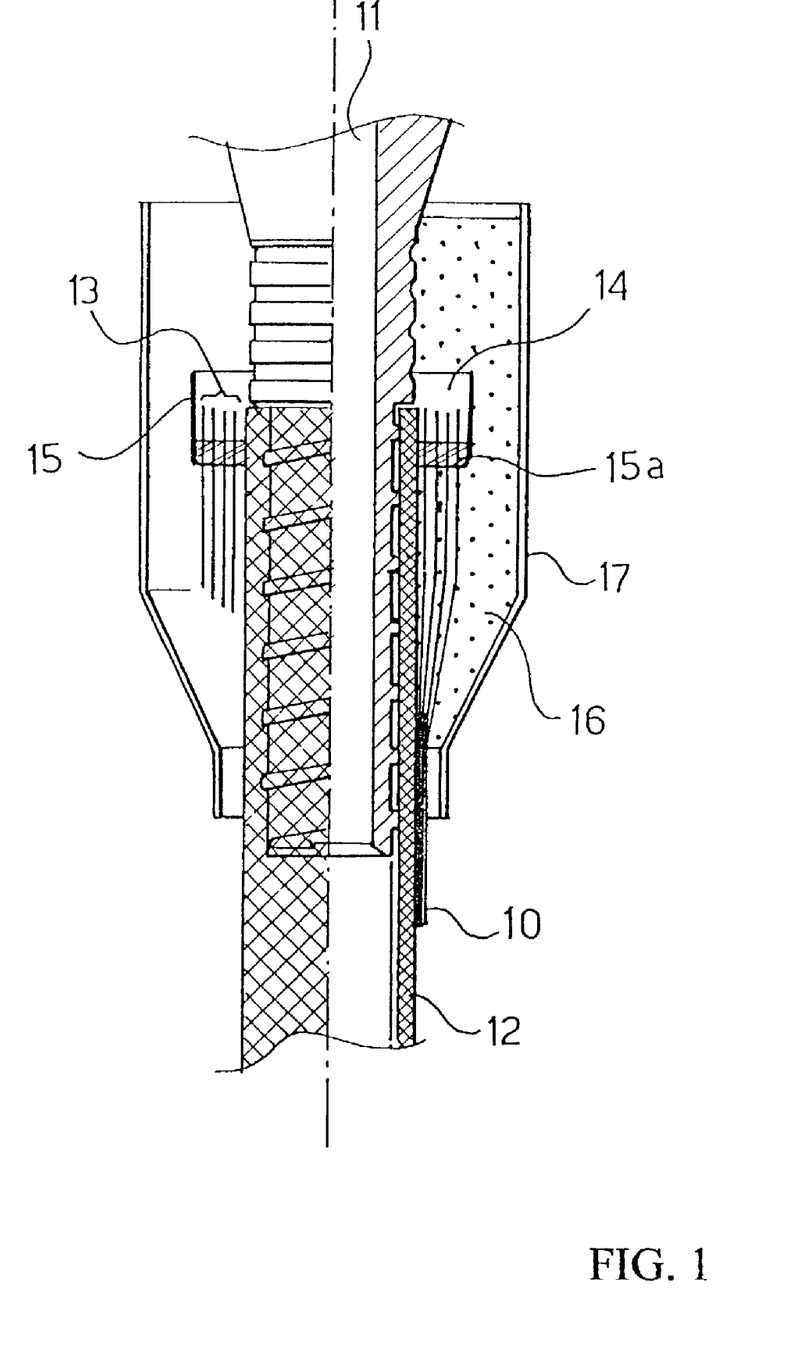
FIG. 1 schematically shows a longitudinal and partly sectional view of a first embodiment of a terminated conductor of superconducting cable according to the present invention.

FIG. 1 shows a first embodiment of a conductor 10 of superconducting cable terminated according to the present invention.

In particular, conductor 10 is representative of a phase conductor of a warm dielectric cable, or a phase conductor of a cold dielectric cable.

The illustrated conductor 10 comprises a plurality of superconducting tapes 13 wound in four layers around a tubular supporting element 12.

The tubular supporting element 12 substantially defines a flow channel for a cryogenic fluid.

The tubular supporting element 12 preferably consists, at least partly, of low electrical resistance material, in order to protect the superconducting tapes against overcurrent, i.e. it also serves as a cryostability device. A suitable tubular supporting element 12 is described in the international patent application WO 00/39812 in the Applicant's name.

The superconducting tapes 13, for example, are Bi-2223 tapes in silver matrix, preferably sealed along their length against the diffusion of the cryogenic fluid, as described in the above patent application WO 01/08234.

A top connector 11, made of an electrically conductive material, such as for example copper, is associated to the superconducting cable radially at conductor 10. In the particular case, top connector 11 is partly screwed into the tubular supporting element 12.

The actual shape of top connector 11 is not important for the purposes of the present invention. It is sufficient that it exhibits fixing means, preferably removable, conjugated to fixing means of a second cable conductor, either superconducting or non-superconducting, or of an electric apparatus in general, such as a transformer, an electrical motor, etcetera.

A collar 15 is arranged coaxially external to the end of conductor 10, i.e. to the end of the group of its superconducting tapes 13. Collar 15 delimits a bulk of thermosetting resin 14, wherein the ends of the superconducting tapes 13 are embedded.

Collar 15 is preferably made of an electrically conductive material.

The thermosetting resin 14 is preferably Araldite® added with HY 951 as a hardener. Moreover, such resin is preferably added with quartz or aluminium oxide [$Al_2(OH)_3$] as a mineral filler.

As an alternative, other thermosetting resins can be used, in particular other epoxy or silicone resins.

A sleeve 17 is arranged coaxially external to collar 15, i.e. around end portions of the group of its superconducting tapes 13 and around an end portion of top connector 11.

Sleeve 17 is preferably made of an electrically conductive material.

Sleeve 17 delimits a bulk of solder 16, wherein the end portions of the superconducting tapes 13 and the end portion of top connector 11 are embedded.

Moreover, since solder 16 infiltrates between the superconducting tapes 13, also the part of support 12 corresponding to the end portions of the superconducting tapes 13 is embedded in solder 16. This is particularly advantageous if said support 12 is made of an at least partly metal material and serves as a cryostability device.

Solder 16 preferably is a Sn, Pb, Bi alloy, such as the DAIKO PFA 140 alloy available from Indium Corporation of America, Utica, N.Y., U.S.A., whose composition is 43% Sn %, 43% Pb and 14% Bi.

While the thermosetting resin 14 effectively proofs the ends of the superconducting tapes 13, an electric contact is achieved by the bulk of solder 16 between conductor 10 and top connector 11, as well as the tubular cryostability element 12.

In other words, a current path is created in the annular ring of solder 16 around collar 15, which exhibits less electrical resistance than that of the thermosetting resin 14.

The bulk of solder 16, that is, the diameter of sleeve 17 with respect to the diameter of collar 15, are to be selected so as to meet the opposed requirements of minimising the space occupied by the conductor termination and minimising the dissipated power at the termination, which as known, is inversely proportional to the cross section of solder 16. The dissipated power at the maximum operating current of the superconducting cable at the maximum operating temperature should preferably be less than 50 W, more preferably less than 20 W and even more preferably, less than 10 W.

In practice, solder 16 exhibits a thickness much larger than a few tens of micromillimetres, i.e. it is in practice too porous to prevent the formation of micro-channels inside which the cryogenic fluid could thus infiltrate in the superconducting tapes 13 in the absence of the thermosetting resin 14, thus degrading their performance.

Moreover, the bulk of solder 16 guarantees the necessary mechanical constrain between conductor 10 and top connector 11.

If the conductor to be terminated is arranged in a substantially horizontal position, collar 15 and sleeve 17 will exhibit a respective opening (not shown) to fill them with the thermosetting resin 14 and with solder 16 respectively.

On the other hand, if the conductor to terminate is arranged in a substantially vertical position, sleeve 17 will advantageously exhibit the shape shown, tapered at its lower end, upstream of the termination. Moreover, in this case, collar 15 could exhibit a bottom 15a, for example made of a plurality of spacing rings between the layers. As an alternative, the termination could be carried out by first filling sleeve 17 only partly with solder 16, up to such a height as to leave the ends of the superconducting tapes 13 free, then filling collar 15 using the hardened solder 16 as a bottom, and afterwards, finishing to fill sleeve 17 with solder 16.

Moreover, both collar 15 and sleeve 17 could be joined with top connector 11, for example through radial cross-pieces (not shown).

As an alternative, conductor 10 can be representative of a return conductor of a cold dielectric cable. In this case, as mentioned at the beginning of the present description, the tubular supporting element 12 of the superconducting tapes 13 is missing, the superconducting tapes 13 being wound on the dielectric. Since the dielectric typically comprises a wrap of paper tapes that could be damaged by the contact with solder 16, it may be necessary to insert a tubular protective element between the dielectric and the superconducting tapes 13. Such a tubular protective element can be regarded as schematically represented in FIG. 1 by the tubular supporting element 12.

Figure 2:
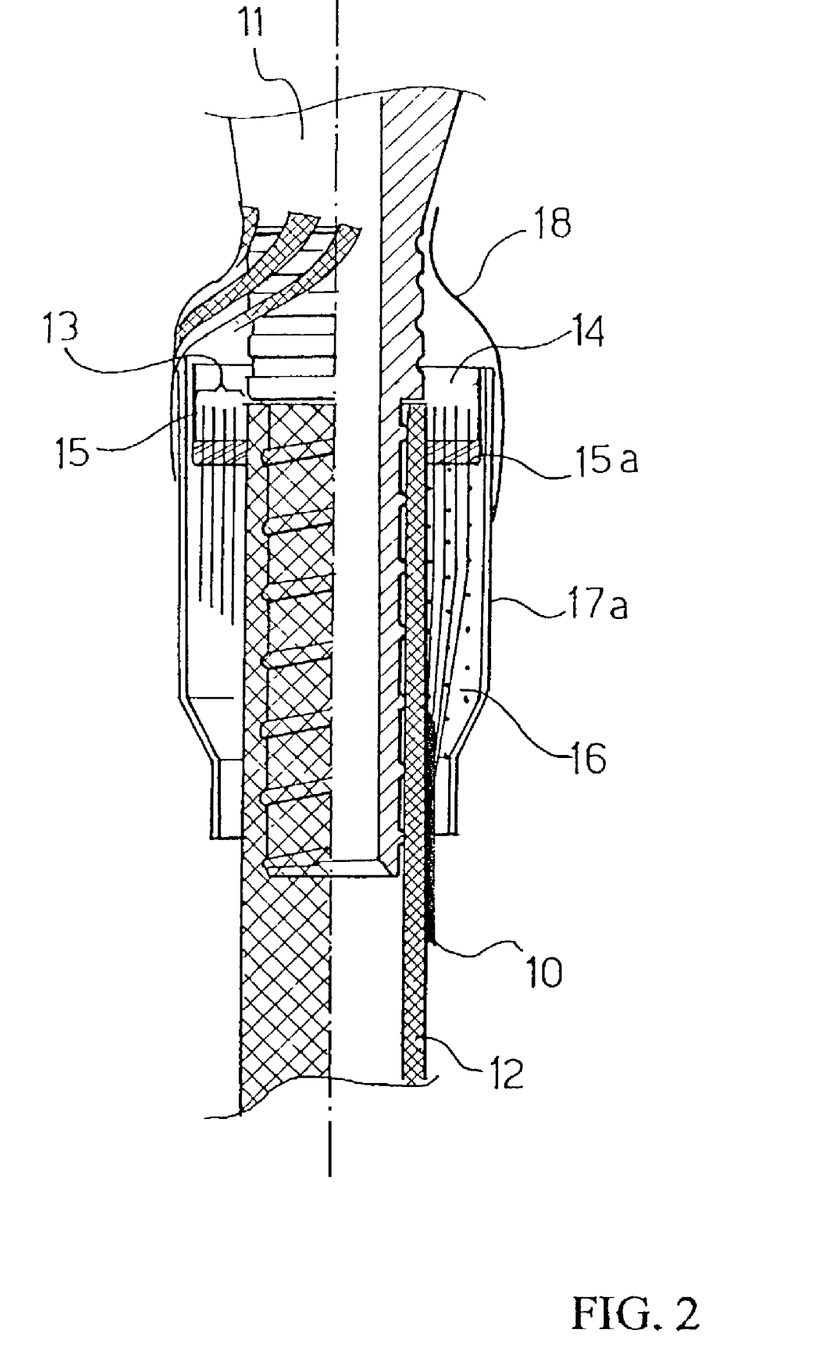
FIG. 2 schematically shows a longitudinal and partly sectional view of a second embodiment of a terminated conductor of superconducting cable according to the present invention.

FIG. 2 shows an embodiment of termination of the conductor of a superconducting cable, which is modified with respect to that illustrated and described with reference to FIG. 1 in the following aspects.

Sleeve 17 is replaced by a sleeve 17a whose inner diameter essentially corresponds to the outer diameter of collar 15 and does not extend longitudinally at the end portion of top connector 11.

Sleeve 17a thus delimits a bulk of solder 16, wherein only the end portions of the superconducting tapes 13 are embedded, whereas the end portion of top connector 11 is not.

The electric contact between conductor 10 and top connector 11 is achieved by solder 16, sleeve 17a and a wrap of conductor braids or tapes 18, for example of copper, between sleeve 17a and top connector 11.

Also in this embodiment, solder 16 in practice exhibits a thickness of more than a few tens of micromillimetres.

Figure 3:
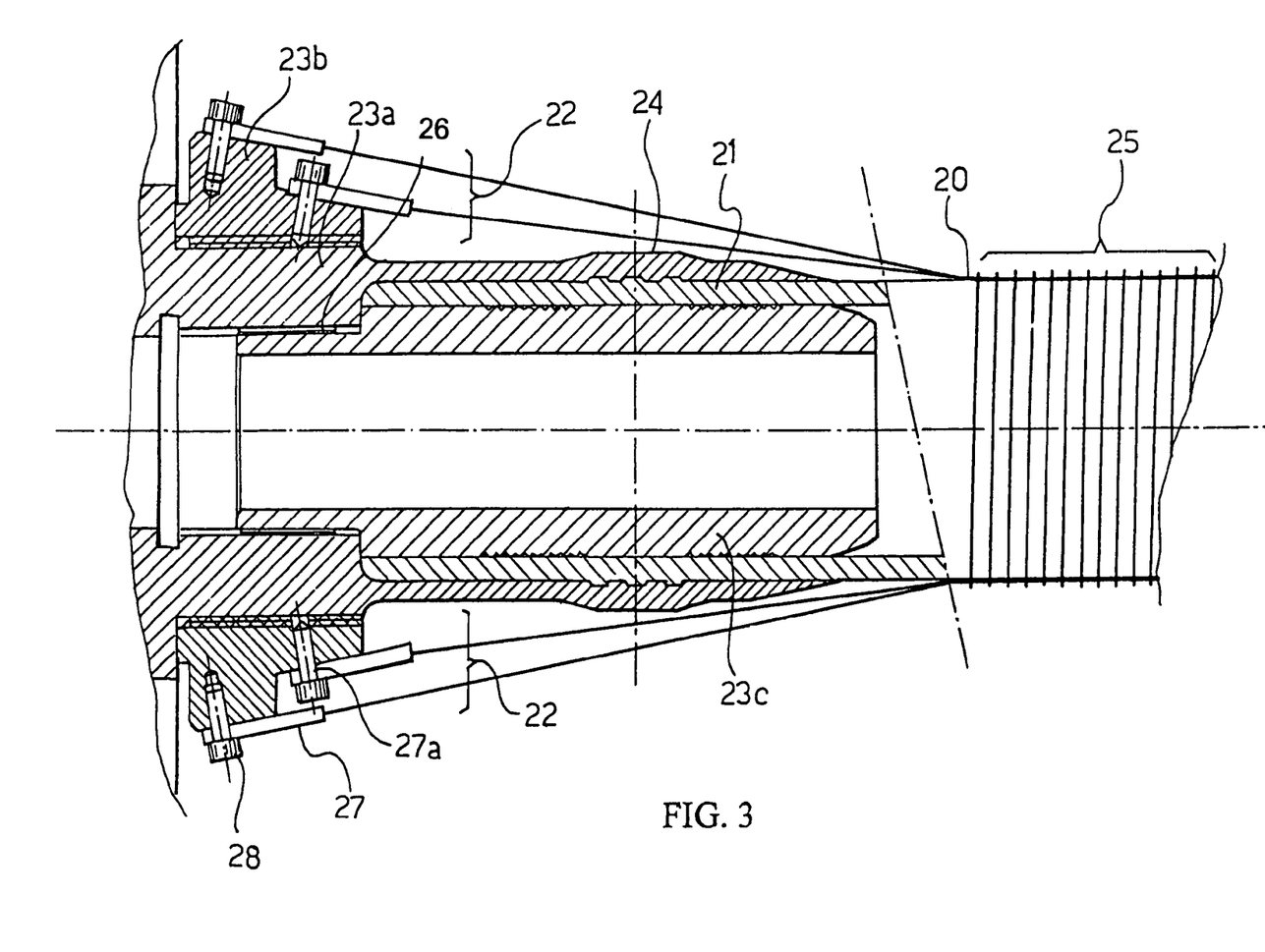
FIG. 3 schematically shows a longitudinal and partly sectional view of a third embodiment of a terminated conductor of superconducting cable according to the present invention.

FIG. 3 shows a third embodiment of a conductor 20 of superconducting cable terminated according to the present invention.

In particular, conductor 20 is representative of a phase conductor of a warm dielectric cable, or of a phase conductor of a cold dielectric cable.

The illustrated conductor 20 comprises a plurality of superconducting tapes 22 wound in two layers around a tubular supporting element 21. The superconducting tapes 22 and the tubular supporting element 21 are as described with reference to the superconducting tapes 13 and to the tubular supporting element 12 respectively of the embodiment of FIG. 1.

A top connector, made of an electrically conductive material, such as for example copper, is radially associated to the superconducting cable at conductor 20. In the particular case, the top connector comprises a first tubular element 23a clamped, such as by a crimping in the region indicated with reference number 24, around the tubular supporting element 21.

In order to prevent distortions and damages to the tubular supporting element 21, the top connector preferably comprises a second tubular element 23c inserted inside the tubular supporting element 21 and coupled to the first tubular element, for example screwed as indicated at 25. Also in this case, the actual shape of top connector 23a–23c is not important.

Figure 4:
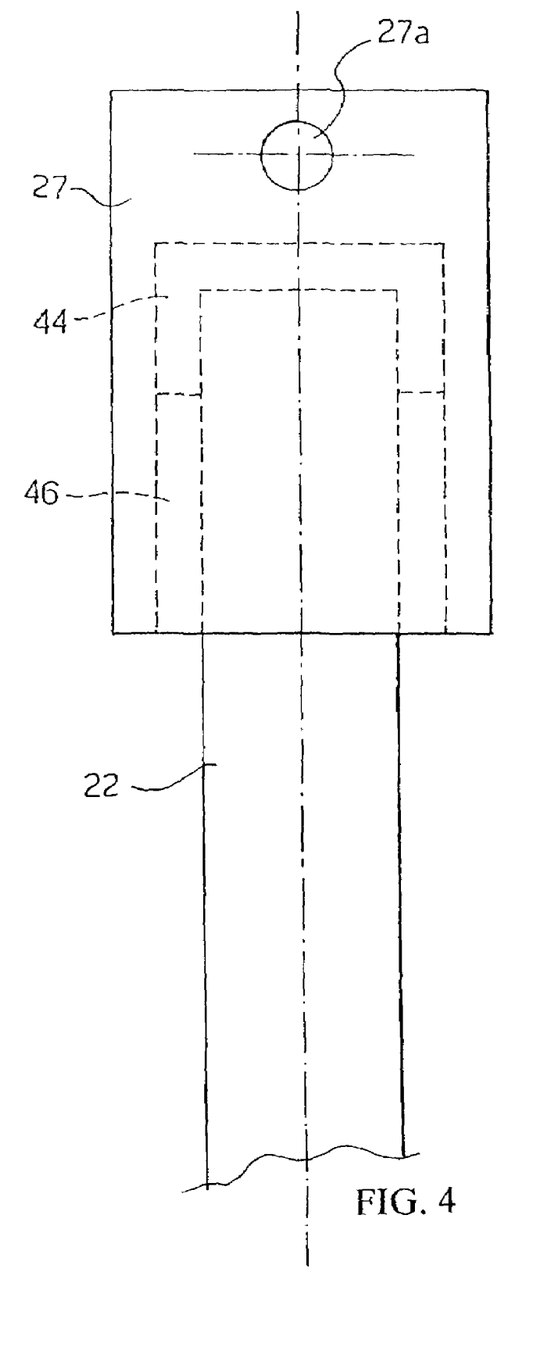
FIGS. 4 and 5 schematically show a detail of the embodiment of FIG. 3, respectively in front and sectioned view.
Figure 5:
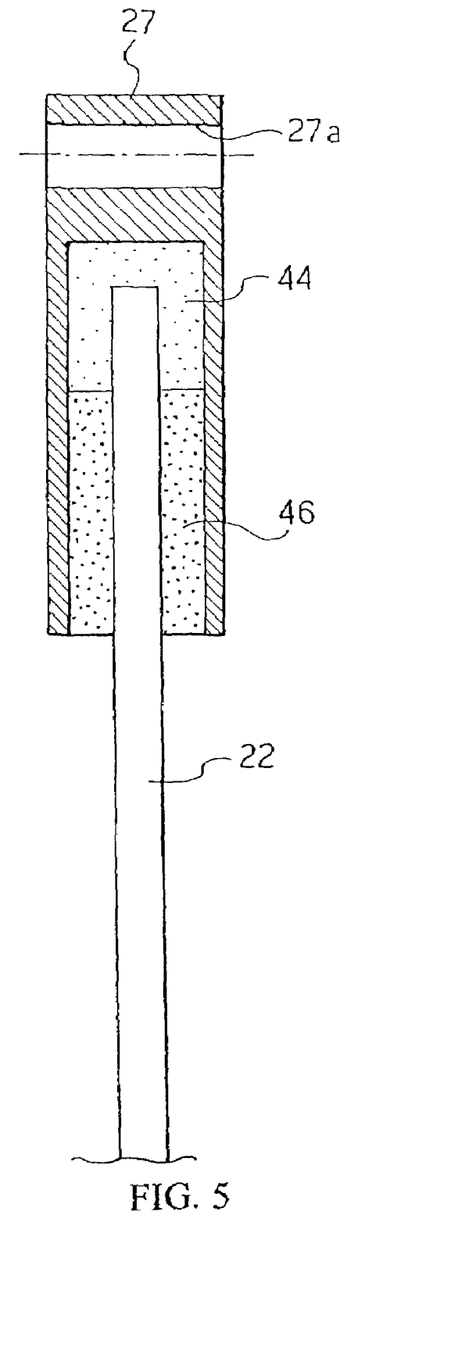

The free end of each superconducting tape 22 is loosely inserted in a respective cap 27, as can be better seen in FIGS. 4 and 5. Each cap 27 is made of an electrically conductive material, for example copper.

Each cap 27 is filled with thermosetting resin 44 for a first part, wherein the end of the respective superconducting tape 22 is embedded.

Moreover, each cap 27 is filled with solder 46 for a second part, wherein an end portion of the respective superconducting tape 22 is embedded.

The thermosetting resin 44 and the solder 46 are as described with reference to the thermosetting resin 14 and the solder 16 respectively of the embodiment of FIG. 1.

Each cap 27 preferably exhibits a hole 27a, optionally threaded, at the opposed end of the insertion end of the respective superconducting tape 22.

Referring again to FIG. 3, each cap 27 is in electric contact with top connector 23a–23c, as by surface contact and fixing by a respective screw 28 to top connector 23a–23c.

In the particular case illustrated in FIG. 3, each cap 27 is fixed to an element 23b of the top connector screwed outside element 23a of the top connector. Element 23b of the top connector exhibits an outside stepwise surface, where the steps are preferably sloped with respect to its longitudinal axis, so that the superconducting tapes 22 of the innermost layer are fixed, by the respective cap 27, at a lower slope than the superconducting tapes of the outermost layer, so that the respective caps 27 and screws 28 do not interfere or damage the superconducting tapes 22 of the outermost layer. Moreover, in this way, a larger diameter is available that allows using caps larger than the superconducting tapes. If conductor 20 exhibits a number of layers of superconducting tapes 22 other than two, element 23b of the top connector will exhibit a corresponding number of steps.

Elements 23a and 23b of the top connector can be replaced with a single element.

Also in the embodiment of FIG. 3, the thermosetting resin 44 proofs the ends of the superconducting tapes 22.

The electric contact between conductor 20 and top connector 23a–23c is achieved by solder 46, caps 27 and the contact relation between caps 27 and top connector 23a–23c.

In case the tubular element 21 is at least partly electrically conductive for cryostability reasons, the electric contact between the tubular element 21 and top connector 23a–23c is provided by the contact relationship between them.

Finally, FIG. 3 shows a wrap 26 of the superconducting tapes 22 upstream of top connector 23a–23c.

Also in the case of the embodiment of FIG. 3, the amount of solder 46 needed to provide sufficient electric conductivity and sufficient mechanical constrain between each superconducting tape 22 and the respective cap 27 is such that, in practice, it is too porous to perform the function of proofing against the cryogenic fluid.

Also conductor 20 of the present embodiment can alternatively represent a return conductor of a cold dielectric cable, with the changes described with reference to the embodiment of FIG. 1.

Figure 6:
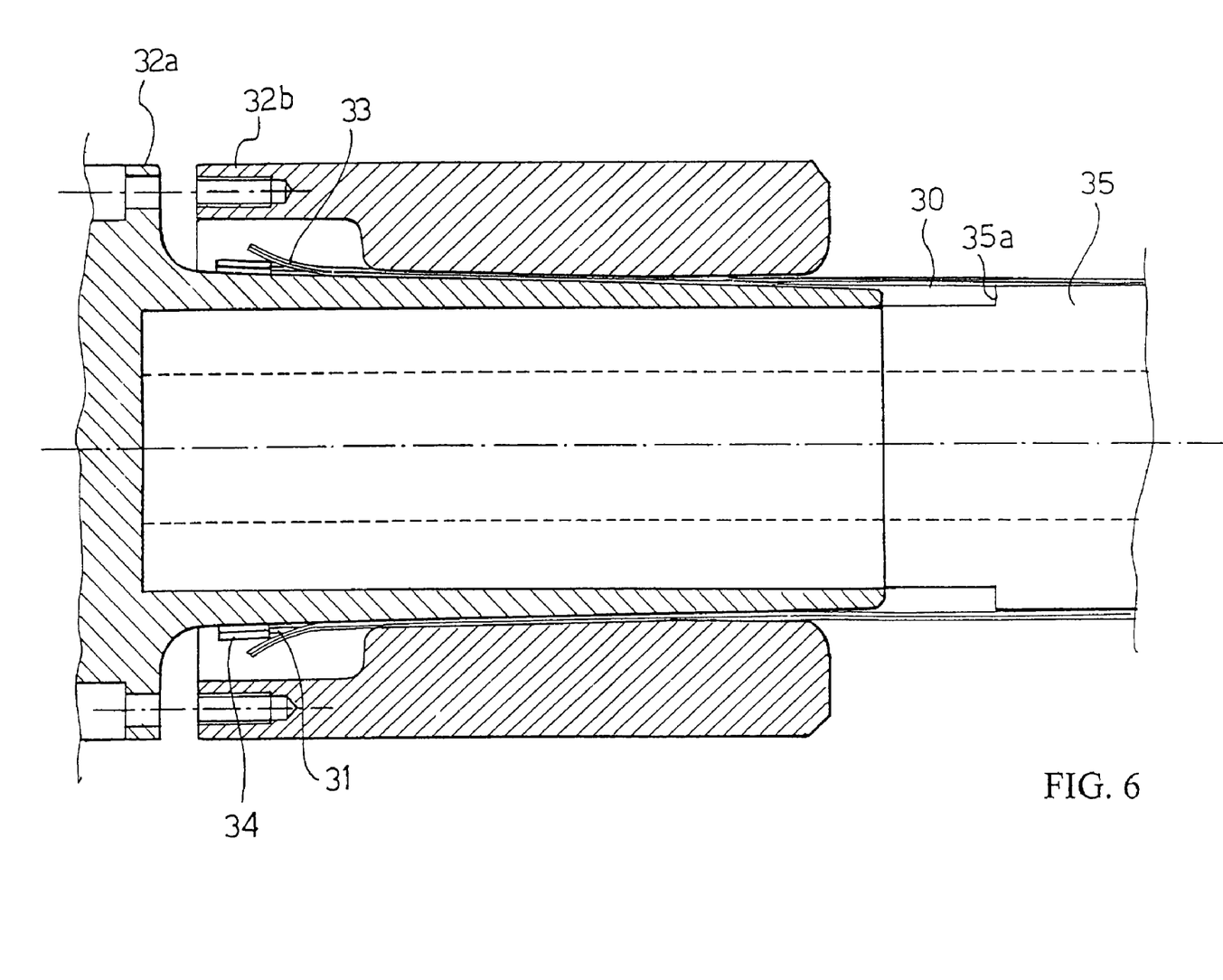
FIG. 6 shows a longitudinal sectional view of a fourth embodiment of a terminated conductor of superconducting cable according to the present invention.

A further embodiment of termination of the conductor of a superconducting cable is illustrated in FIG. 6. Such embodiment is particularly advantageous in the case of a return conductor of a cold dielectric cable.

The illustrated conductor 30 comprises a plurality of superconducting tapes 31 wound in two layers around an insulator 35. The superconducting tapes 31 are as described with reference to the superconducting tapes 13 of the embodiment of FIG. 1.

Moreover, there are illustrated two layers of conductive tapes 33, for example of copper, wound around the superconducting tapes 31 and having the function of a cryostability device, as described in the international patent application WO 00/39812 in the Applicant's name.

The free end of each superconducting tape 31 is inserted in a respective cap 34 containing thermosetting resin 44 and solder 46 analogously to what described with reference to FIGS. 3–5.

The superconducting tapes 31 are radially spaced from dielectric 35, for example by thinning dielectric 35, as shown at 35a.

A top connector comprises a first electrically conductive tubular element 32a, for example of copper or alloys thereof, inserted on the superconducting cable between dielectric 35 and the superconducting tapes 31, and a second electrically conductive tubular element 32b, for example of copper or alloys thereof, inserted on the superconducting cable outside the superconducting tapes 31 and the conducting tapes 33, if present.

The outside surface of the first tubular element 32a and the inside surface of the second tubular element 32b are sloped as regards to the respective longitudinal axes, with inclination angles selected so that the first and the second tubular element 32a, 32b of the top connector establish a conical coupling, thus providing the necessary mechanical constrain between top connector 32a, 32b and the superconducting tapes 32 as well as the conductive tapes 33, if present.

The electric contact between conductor 30 and top connector 32a–32b is achieved by solder 46, caps 34 and the contact relationship between caps 34 and top connector 32a–32b.

Caps 34 can be fixed to top connector 32a analogously to what described with reference to the embodiment of FIG. 3.

Figure 7:
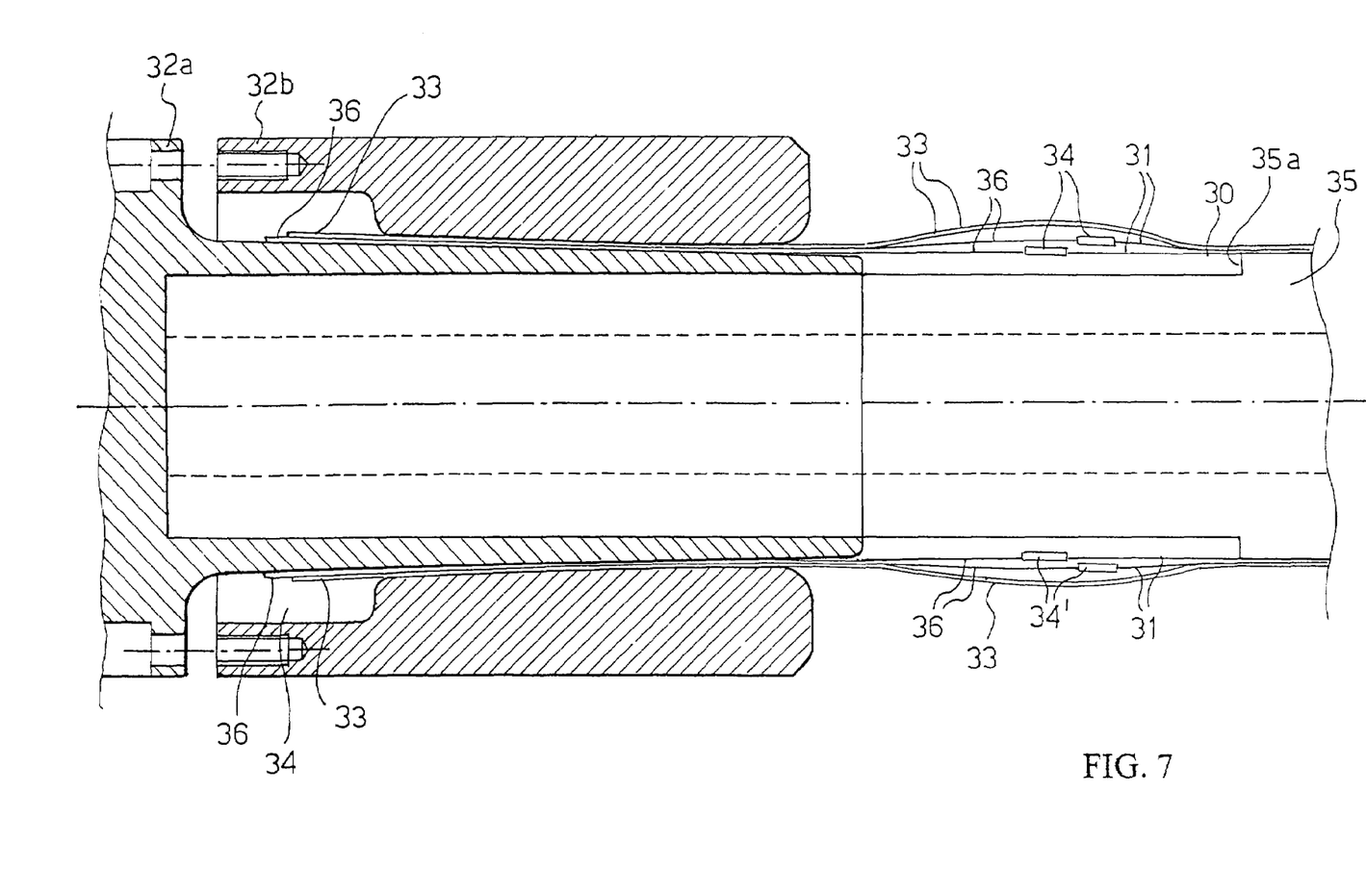
FIG. 7 shows a longitudinal sectional view of a fifth embodiment of a terminated conductor of superconducting cable according to the present invention.

FIG. 7 shows an embodiment of termination of the conductor of a superconducting cable that is modified with respect to that illustrated and described with reference to FIG. 6 in the following aspects.

The superconducting tapes 31 are cut upstream of top connector 32a, 32b and inserted in respective caps 34' similar to caps 34 of the embodiment of FIGS. 3–5, but showing a respective conductive tape 36, for example made of copper or alloys thereof, extending from the end opposed to that of insertion of the respective superconducting tape 31. Caps 34' do not exhibit hole 27a present in caps 34 of the embodiment of FIGS. 3–5.

In this way, the conductive tapes 36 and the optional cryostability conductive tapes 33 are clamped by the conical coupling provided by the two tubular elements 32a, 32b of the top connector, whereas the superconducting tapes 31 are not. Thus, the superconducting tapes 31 are not stressed, thus preventing any risk of damage.

The electric contact between conductor 30 and top connector 32a, 32b is achieved by solder 46, caps 34', conductive tapes 36 and the contact relation between the conductive tapes 36 and top connector 32a–32b.

In an alternative embodiment (not shown), collar 15 of the embodiment of FIGS. 1 and 2 and the respective thermosetting resin 14 could be replaced with a plurality of caps similar to caps 27 of the embodiment of FIG. 3, each cap being filled with just the thermosetting resin.

FIGS. from 8 to 14 show, in a very schematic manner, some embodiments of joint between conductors of two superconducting cables according to the present invention, which shall be described only in their major features. For further details, reference shall be each time made to the description of the relevant FIGS. from 1 to 7.

All FIGS. from 8 to 14 show a conductor 50 of a first superconducting cable, comprising a plurality of superconducting tapes 51 wound in more layers around a tubular supporting element 52, and a conductor 60 of a second superconducting cable, comprising a plurality of superconducting tapes 61 wound in more layers around a tubular supporting element 62.

Moreover, an electrically conductive connector 70 which butt-couples the two conductors 50, 60, for example by being inserted in the tubular supporting elements 52, 62, is illustrated. Connector 70 is schematically indicated as single-piece, but as an alternative it can comprise two complementary elements removably connected to one another.

Figure 8:
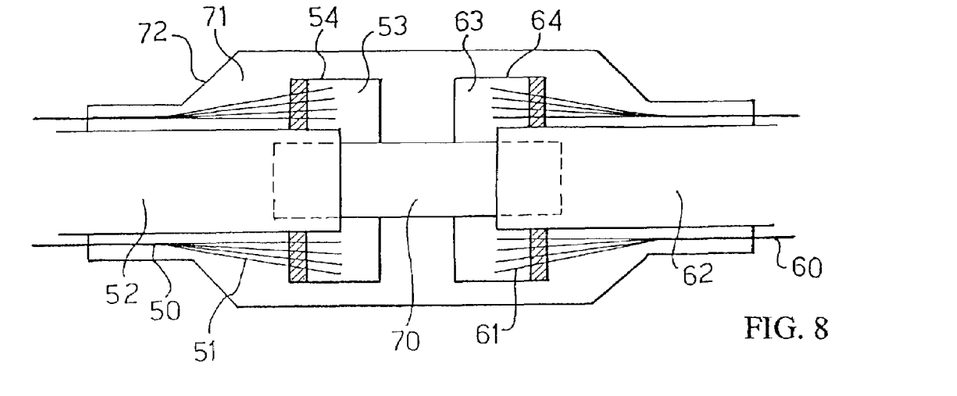
FIGS. 8–14 schematically show some embodiments of joints between conductors of two superconducting cables according to the present invention.

In the embodiment of FIG. 8, the ends of the superconducting tapes 51 of the first conductor 50 are embedded in a first bulk 53 of thermosetting resin contained in a first collar 54, and the ends of the superconducting tapes 61 of the second conductor 60 are embedded in a second bulk 63 of thermosetting resin contained in a second collar 64. The bulks of thermosetting resin 53 and 63 are illustrated as having also respective portions of connector 70 embedded, but this is not necessary.

The end portions of the superconducting tapes 51 of the first conductor 50 and the end portions of the superconducting tapes 61 of the second conductor 60 are embedded in a common bulk 71 of solder contained in a common sleeve 72.

Figure 9:
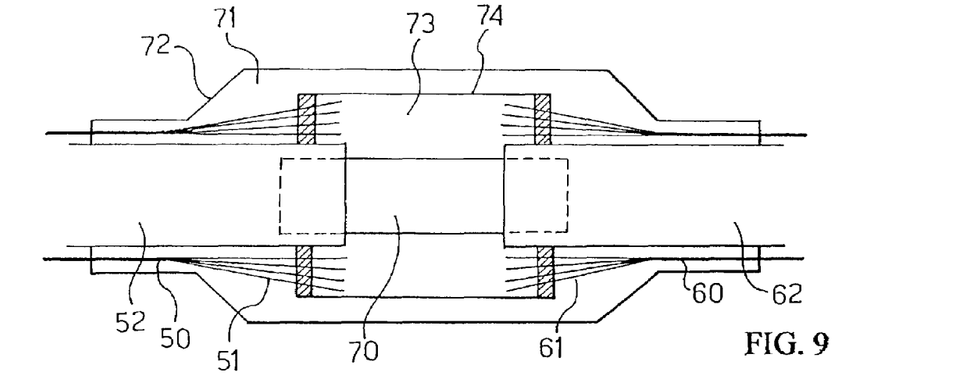

The embodiment of FIG. 9 differs from that of FIG. 8 in that the ends of the superconducting tapes 51 of the first conductor 50 and the ends of the superconducting tapes 61 of the second conductor 60 are embedded in a common bulk 73 of thermosetting resin contained in a common collar 74. The bulk of thermosetting resin 73 has also the corresponding portion of connector 70 embedded.

Figure 10:
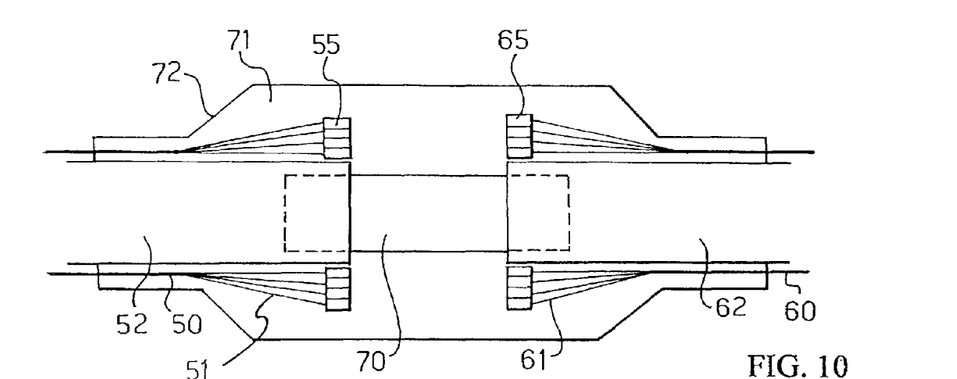

The embodiment of FIG. 10 differs from that of FIG. 8 in that the ends of the superconducting tapes 51 of the first conductor 50 and the ends of the superconducting tapes 61 of the second conductor 60 are embedded in respective bulks of thermosetting resin contained in respective caps 55, 65.

Figure 11:
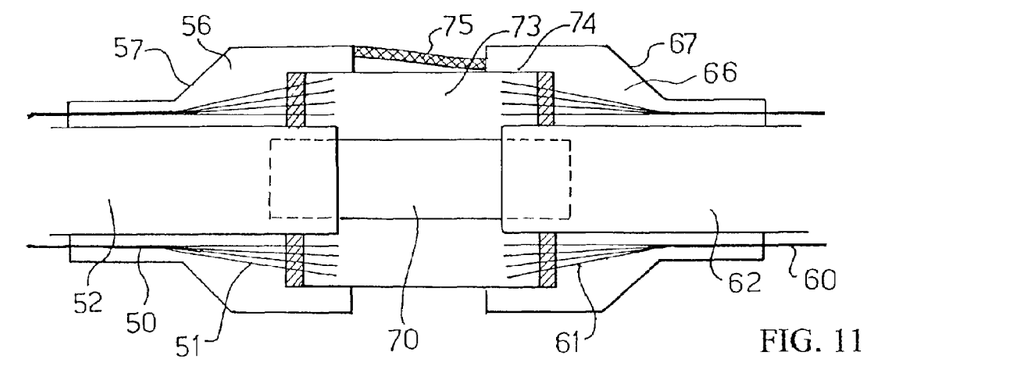

In the embodiment of FIG. 11, the ends of the superconducting tapes 51 of the first conductor 50 and the ends of the superconducting tapes 61 of the second conductor 60 are embedded in a common bulk 73 of thermosetting resin contained in a common collar 74. The bulk of thermosetting resin 73 has also the matching portion of connector 70 embedded.

The end portions of the superconducting tapes 51 of the first conductor 50 are embedded in a first bulk 56 of solder contained in a first sleeve 57 and the ends of the superconducting tapes 61 of the second conductor 60 are embedded in a second bulk 66 of solder contained in a second sleeve 67. A wrap of conductive tapes or braids 75, for example of copper, electrically connects sleeves 57, 67.

Figure 12:
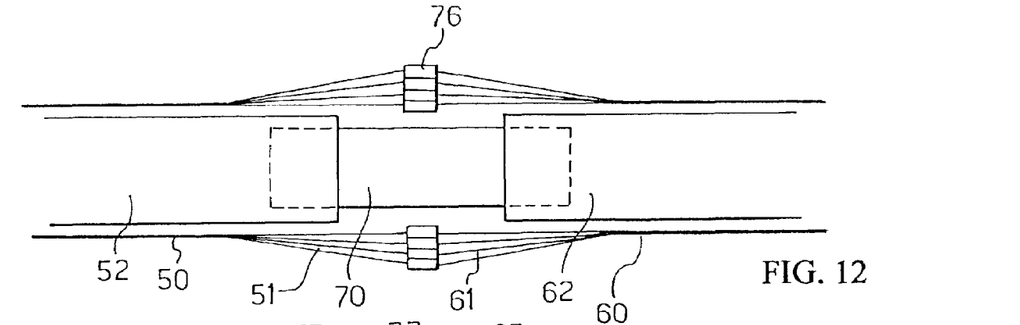

In the embodiment of FIG. 12, the free ends of the superconducting tapes 51 of the first conductor 50 and the free ends of the superconducting tapes 61 of the second conductor 60 are inserted in pairs in common caps 76. Caps 76, of course provided with through holes, are filled, in a central part, with thermosetting resin, wherein the ends of both superconducting tapes 51, 61 are embedded, and, in two parts adjacent to the central part, with solder, wherein the end portions of each superconducting tape 51, 61 are individually embedded.

Figure 13:
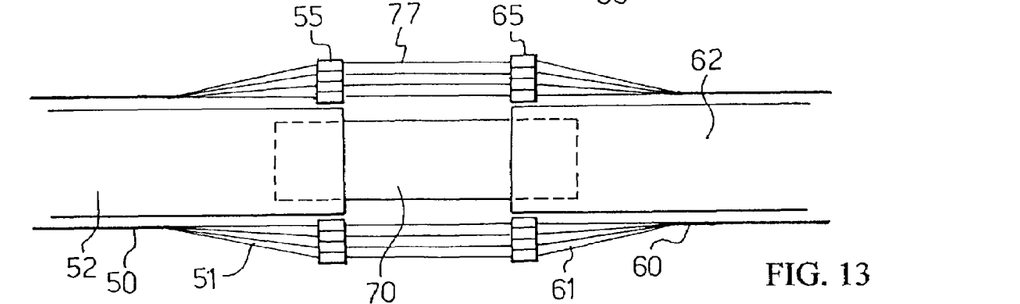

In the embodiment of FIG. 13, the free ends of the superconducting tapes 51 of the first conductor 50 are inserted in respective caps 55 and the free ends of the superconducting tapes 61 of the second conductor 60 are inserted in respective caps 65. Caps 55 and 65 are each filled with a bulk of thermosetting resin at the end of the respective superconducting tape 51, 61, and with a bulk of solder at the end portion of the respective superconducting tape 51, 61. Moreover, caps 55 and 65 are connected in pairs by a respective common conductive tape 77.

Figure 14:
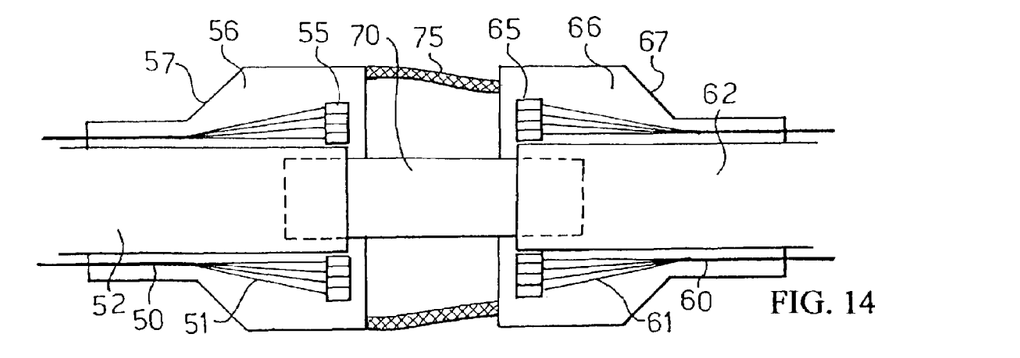

In the embodiment of FIG. 14, the free ends of the superconducting tapes 51 of the first conductor 50 are inserted in respective caps 55 and the free ends of the superconducting tapes 61 of the second conductor 60 are inserted in respective caps 65. Caps 55 and 65 are each filled with a bulk of thermosetting resin at the end of the respective superconducting tape 51, 61.

The end portions of the superconducting tapes 51 of the first conductor 50 are embedded in a first bulk 56 of solder contained in a first sleeve 57 and the ends of the superconducting tapes 61 of the second conductor 60 are embedded in a second bulk 66 of solder contained in a second sleeve 67. A wrap of conductive tapes or braids 75, for example of copper, electrically connects sleeves 57, 67.

EXAMPLE 1

A conductor sample was made using Bi-2223 superconducting tapes in silver matrix for which proof against the infiltration of liquid nitrogen along their entire length had been previously checked. The conductor sample is 10 metres long.

The sample was terminated at each end as described with reference to FIG. 1, using Araldite® added with HY 951 and aluminium oxide, as thermosetting resin 14, and alloy DAIKO PFA 140 as solder 16.

The sample thus terminated was mounted into a cryostat and constrained at the ends on a stiff frame, so as to simulate the traction to which the termination is subject in a clamped-head installation configuration. As known, such a configuration represents the most critical condition of traction by shrinkage upon cooling of the superconducting cable.

The sample was immersed in liquid nitrogen and subjected to 10 thermal cycles between ambient temperature and the operating temperature of 77K at atmospheric pressure. Afterwards, still in clamped-head configuration, the sample was left immersed for 120 hours in liquid nitrogen at a pressure of about 30 bar.

At the end of the above stresses, the sample was analysed.

Thermosetting resin 14 and solder 16 did not exhibit either cracks or fractures. The superconducting tapes 13 did not exhibit either surface "balloons" or other damages.

EXAMPLE 2

A sample of cold dielectric superconducting cable (free from cryostat) was made using Bi-2223 superconducting tapes in silver matrix for which proof against the infiltration of liquid nitrogen along their entire length had been previously checked. The conductor cable sample is 10 metres long.

The phase conductor of the sample was terminated at each end as described with reference to FIG. 3, and the return conductor of the superconducting cable sample was terminated at each end as described with reference to FIG. 6.

Araldite® added with HY 951 and aluminium oxide, as thermosetting resin 44, and the above alloy DAIKO PFA 140 as solder 46 were used in all of the terminations.

The sample thus terminated was mounted into a cryostat and constrained at the ends on a stiff frame, so as to simulate the traction to which the termination is subject in a clamped-head installation configuration.

The sample was immersed in liquid nitrogen and subjected to 10 thermal cycles between ambient temperature and the operating temperature of 77K at atmospheric pressure.

Afterwards, the sample was left immersed for 120 hours in liquid nitrogen at a pressure of about 30 bar.

At the end of the above stresses, the sample was analysed.

Thermosetting resin 44 and solder 46 inside caps 27, 34 did not exhibit either cracks or fractures. The superconducting tapes 22, 32 did not exhibit either surface "balloons" or other damages.

Moreover, the termination according to the invention meets the requirements of mechanical constrain and protection of the integrity of the superconducting tapes.

The invention claimed is:

1. A method of terminating a conductor of a superconducting cable, the conductor comprising a plurality of superconducting tapes, the method comprising:
   disposing an electrically conductive connector radially at the conductor;
   embedding first portions of the plurality of superconducting tapes in a thermosetting resin, each of the first portions being a respective end of each of the plurality of superconducting tapes;
   embedding second portions of the plurality of superconducting tapes in a solder, each of the second portions being a respective longitudinal part of each of the plurality of superconducting tapes, each said longitudinal part being adjacent to a corresponding one of the first portions,
   wherein the solder is a common bulk of solder; and
   wherein said embedding the second portions of the plurality of superconducting tapes in the solder is carried out by providing at least one sleeve surrounding an end portion of the conductor and filling the sleeve with the solder; and
   electrically connecting the electrically conductive connector to the conductor through the solder.

2. A method of terminating a conductor of a superconducting cable, the conductor comprising a plurality of superconducting tapes, the method comprising:
   disposing an electrically conductive connector radially at the conductor;
   embedding first portions of all the plurality of superconducting tapes in a thermosetting resin, each of the first portions being a respective end of each of the plurality of superconducting tapes, the thermosetting resin being a common bulk thermosetting resin;
   wherein embedding the first portions of the plurality of superconducting tapes in the thermosetting resin is further carried out by providing at least one collar surrounding at least one end of the conductor and filling the collar with the thermosetting resin;
   embedding second portions of the plurality of superconducting tapes in a solder, each of the second portions being a respective longitudinal part of each of the plurality of superconducting tapes, each said longitudinal part being adjacent to a corresponding one of the first portions; and electrically connecting the electrically conductive connector to the conductor through the solder.

3. A method of terminating a conductor of a superconducting cable, the conductor comprising a plurality of superconducting tapes, the method comprising:
  disposing an electrically conductive connector radially at the conductor;
  embedding individually first portions of the plurality of superconducting tapes in a respective one of a plurality of bulks of thermosetting resin, each of said first portions being a respective end of each of the plurality of superconducting tapes;
  embedding second portions of the plurality of superconducting tapes in a solder, each of the second portions being a respective longitudinal part of each of the plurality of superconducting tapes, each said longitudinal part being adjacent to a corresponding one of the first portions; and
  electrically connecting the electrically conductive connector to the conductor through the solder.

4. A method according to claim 3, wherein said embedding each said first portion of the plurality of superconducting tapes is carried out by inserting the first portion of each of said plurality of superconducting tapes in a respective cap and filling at least partly each said cap with the thermosetting resin.

5. A method of terminating a conductor of a superconducting cable, the conductor comprising a plurality of superconducting tapes, the method comprising:
  disposing an electrically conductive connector radially at the conductor;
  embedding first portions of the plurality of superconducting tapes in a thermosetting resin, each of the first portions being a respective end of each of the plurality of superconducting tapes;
  embedding individual second portions of the plurality of superconducting tapes in a respective one of a plurality of bulks of solder, each of the individual second portions being a respective longitudinal part of each of the plurality of superconducting tapes, each said longitudinal part being adjacent to a corresponding one of the first portions;
  electrically connecting the electrically conductive connector to the conductor through the solder.

6. A method of terminating a conductor of a superconducting cable, the conductor comprising a plurality of superconducting tapes, the method comprising:
  disposing an electrically conductive connector radially at the conductor;
  embedding first portions of the plurality of superconducting tapes in a thermosetting resin, each of the first portions being a respective end of each of the plurality of superconducting tapes;
  embedding second portions of the plurality of superconducting tapes in a solder, each of the second portions being a respective longitudinal part of each of the plurality of superconducting tapes, each said longitudinal part being adjacent to a corresponding one of the first portions;
  electrically connecting the electrically conductive connector to the conductor through the solder; and
  the first portions of each of said superconducting tapes in a respective one of a plurality of electrically conductive caps,
  wherein said embedding said each of said first portions of the plurality of superconducting tapes in said thermosetting resin is carried out by filling a first part of each of said plurality of caps with the thermosetting resin,
  and wherein said embedding second portions of the plurality of superconducting tapes in the solder is carried out by filling at least a second part of each said plurality of caps with the solder.

7. A method according to claim 6, wherein said electrically connecting the electrically conductive connector to the conductor through the solder is carried out by fixing each said cap in contact with the connector.

8. A method according to claim 6, wherein said step of electrically connecting the electrically conductive connector to the conductor through the solder comprises providing a plurality of electrically conductive tapes, each of which extending from a corresponding one of the plurality of caps.

9. A method of terminating a conductor of a superconducting cable, the conductor comprising a plurality of superconducting tapes, the method comprising:
  disposing an electrically conductive connector radially at the conductor;
  embedding first portions of the plurality of superconducting tapes in a thermosetting resin, each of the first portions being a respective end of each of the plurality of superconducting tapes;
  embedding second portions of the plurality of superconducting tapes in a solder, each of the second portions being a respective longitudinal part of each of the plurality of superconducting tapes, each said longitudinal part being adjacent to a corresponding one of the first portions;
  electrically connecting the electrically conductive connector to the conductor through the solder; and
  achieving an electric contact between the connector and a cryostability device associated to the superconducting tapes.

10. A method according to claim 9, wherein the cryostability device is a tubular, at least partly conductive element supporting the plurality of superconducting tapes, and wherein said achieving an electric contact between the connector and the cryostability device, and said embedding the second portions of the plurality of superconducting tapes in the solder are carried out by embedding the second portions of at least all superconducting tapes of the conductor and a corresponding portion of the tubular element in a common bulk of solder.

11. A method according to claim 9, wherein the cryostability device is an at least partly conductive screen coaxially external to the plurality of superconducting tapes, and wherein said achieving an electric contact between the connector and the cryostability device is carried out by fixing a portion of the screen in contact with the connector.

12. A method of terminating a conductor of a superconducting cable, the conductor comprising a plurality of superconducting tapes, the method comprising:
  disposing an electrically conductive connector radially at the conductor;
  embedding first portions of the plurality of superconducting tapes in a thermosetting resin, each of the first portions being a respective end of each of the plurality of superconducting tapes;
  embedding second portions of the plurality of superconducting tapes in a solder, each of the second portions being a respective longitudinal part of each of the plurality of superconducting tapes, each said longitudinal part being adjacent to a corresponding one of the first portions, wherein the solder has a melting point lower than a temperature which would damage the superconducting tapes, wherein the solder is a Sn—Pb—Bi alloy; and electrically connecting the electrically conductive connector to the conductor through the solder.

13. A method according to claim 12, wherein the solder is an alloy comprising 43% Sn, 43% Pb and 14% Bi.

14. A method of terminating a conductor of a superconducting cable, the conductor comprising a plurality of superconducting tapes, the method comprising:

disposing an electrically conductive connector radially at the conductor;

embedding first portions of the plurality of superconducting tapes in a thermosetting resin, each of the first portions being a respective end of each of the plurality of superconducting tapes;

embedding second portions of the plurality of superconducting tapes in a solder, each of the second portions being a respective longitudinal part of each of the plurality of superconducting tapes, each said longitudinal part being adjacent to a corresponding one of the first portions, wherein the thermosetting resin is a resin selected from a group of epoxy and silicone resins, wherein the epoxy resin is Araldite®; and electrically connecting the electrically conductive connector to the conductor through the solder.

15. A method of terminating a conductor of a superconducting cable, the conductor comprising a plurality of superconducting tapes, the method comprising:

disposing an electrically conductive connector radially at the conductor;

embedding first portions of the plurality of superconducting tapes in a thermosetting resin, each of the first portions being a respective end of each of the plurality of superconducting tapes;

embedding second portions of the plurality of superconducting tapes in a solder, each of the second portions being a respective longitudinal part of each of the plurality of superconducting tapes, each said longitudinal part being adjacent to a corresponding one of the first portions, wherein the thermosetting resin is added with a hardener, wherein the thermosetting resin is Araldite® added, and the hardener is HY 951; and electrically connecting the electrically conductive connector to the conductor through the solder.

16. A method of terminating a conductor of a superconducting cable, the conductor comprising a plurality of superconducting tapes, the method comprising:

disposing an electrically conductive connector radially at the conductor;

embedding first portions of the plurality of superconducting tapes in a thermosetting resin, each of the first portions being a respective end of each of the plurality of superconducting tapes, wherein the thermosetting resin is added with a mineral filler, and wherein the mineral filler is selected from the group of quartz and aluminium oxide;

embedding second portions of the plurality of superconducting tapes in a solder, each of the second portions being a respective longitudinal part of each of the plurality of superconducting tapes, each said longitudinal part being adjacent to a corresponding one of the first portions; and electrically connecting the electrically conductive connector to the conductor through the solder.

17. A method according to claim 16, wherein the thermosetting resin is Araldite® and the mineral filler is aluminium oxide.

18. A method of terminating a conductor of a superconducting cable, the conductor comprising a plurality of superconducting tapes, the method comprising:

disposing an electrically conductive connector radially at the conductor;

embedding first portions of the plurality of superconducting tapes in a thermosetting resin, each of the first portions being a respective end of each of the plurality of superconducting tapes, wherein the superconducting material of each at said plurality superconducting tapes is an oxide of bismuth, lead, strontium, calcium, or copper (BSCCO);

embedding second portions of the plurality of superconducting tapes in a solder, each of the second portions being a respective longitudinal part of each of the plurality of superconducting tapes, each said longitudinal part being adjacent to a corresponding one of the first portions; and electrically connecting the electrically conductive connector to the conductor through the solder.

19. A method of terminating a conductor of a superconducting cable, the superconducting cable comprising a plurality of superconducting tapes, the method comprising:

disposing an electrically conductive connector radially at the conductor;

embedding first portions of the plurality of superconducting tapes in a thermosetting resin, each of the first portions being a respective end of each of the plurality of superconducting tapes, wherein each of said plurality of superconducting tapes comprises a sealing structure hermetically surrounding an outside surface of said each of said plurality of superconducting tapes along an entire length of each of said plurality of each superconducting tapes;

embedding second portions of the plurality of superconducting tapes in a solder, each of the second portions being a respective longitudinal part of each of the plurality of superconducting tapes, each said longitudinal Part being adjacent to a corresponding one of the first portions; and electrically connecting the electrically conductive connector to the conductor through the solder.

* * * * *

UNITED STATES PATENT AND TRADEMARK OFFICE
CERTIFICATE OF CORRECTION

PATENT NO. : 7,040,002 B2
APPLICATION NO. : 10/218636
DATED : May 9, 2006
INVENTOR(S) : Walter Castiglioni et al.

It is certified that error appears in the above-identified patent and that said Letters Patent is hereby corrected as shown below:

*On the title page, item (75), line 2, "Cemusco" should read --Cernusco--.

*On the title page, item (57), line 5, "and end" should read --an end--.

*In claim 6, column 15, line 63, before "the first" insert --arranging--.

In claim 15, column 17, line 45, "resin is Araldite® added," should read --resin added is Araldite®,--.

In claim 18, column 18, line 24, "each at said" should read --each of said--.

*In claim 19, column 18, line 54, "Part" should read --part--.

Signed and Sealed this

Fifth Day of September, 2006

JON W. DUDAS
*Director of the United States Patent and Trademark Office*